United States Patent
Makam et al.

(10) Patent No.: US 12,135,616 B1
(45) Date of Patent: Nov. 5, 2024

(54) PRESERVING STORAGE EFFICIENCY DURING RESTORATION OF DATA FROM THE CLOUD TO A DATA STORAGE SYSTEM

(71) Applicant: NetApp, Inc., San Jose, CA (US)

(72) Inventors: Sumith Makam, Bangalore (IN); Roopesh Chuggani, Bengaluru (IN); Dnyaneshwar Pawar, Karnataka (IN); Abhisar, Uttar Pradesh (IN)

(73) Assignee: NetApp, Inc., San Jose, CA (US)

( * ) Notice: Subject to any disclaimer, the term of this patent is extended or adjusted under 35 U.S.C. 154(b) by 11 days.

(21) Appl. No.: 18/304,583

(22) Filed: Apr. 21, 2023

(51) Int. Cl.
*G06F 11/14* (2006.01)

(52) U.S. Cl.
CPC ................ *G06F 11/1451* (2013.01)

(58) Field of Classification Search
CPC .......... G06F 11/1451; G06F 11/1453
USPC .......................................................... 714/15
See application file for complete search history.

(56) References Cited

U.S. PATENT DOCUMENTS

| | | | |
|---|---|---|---|
| 8,533,410 B1 | 9/2013 | Corbett et al. | |
| 9,367,551 B2 | 6/2016 | Beaverson et al. | |
| 9,679,040 B1 | 6/2017 | Davis et al. | |
| 9,798,496 B2 | 10/2017 | Varghese et al. | |
| 9,811,532 B2 | 11/2017 | Parkison et al. | |
| 9,904,598 B2 | 2/2018 | Kumarasamy | |
| 10,031,917 B2 | 7/2018 | Kumarasamy et al. | |
| 10,037,154 B2 | 7/2018 | Provenzano et al. | |
| 10,089,187 B1 | 10/2018 | Pecoraro et al. | |
| 10,127,119 B1 | 11/2018 | Paulzagade et al. | |
| 10,162,722 B2 | 12/2018 | Lin et al. | |
| 10,176,183 B1 | 1/2019 | Shim et al. | |
| 10,852,976 B2 | 12/2020 | George et al. | |
| 11,144,502 B2 | 10/2021 | George et al. | |
| 2012/0089579 A1 | 4/2012 | Ranade et al. | |
| 2012/0089775 A1 | 4/2012 | Ranade et al. | |
| 2013/0110779 A1 | 5/2013 | Taylor et al. | |

(Continued)

OTHER PUBLICATIONS

Perry Y., "Storage Snapshots Deep-Dive: Cloud Volumes Snapshots," Jun. 28, 2018, pp. 1-4. URL: https://cloud.netapp.com/blog/snapshots-technology-cloud-volumes.

(Continued)

*Primary Examiner* — Chae M Ko
(74) *Attorney, Agent, or Firm* — Jaffery Watson Hamilton & DeSanctis LLP

(57) ABSTRACT

Systems and methods for preserving storage efficiency during restoration of data from the cloud are provided. In one embodiment, a CBMAP is maintained that maps cloud block numbers (CBNs) to respective corresponding block numbers of a volume of a data storage system in which previously restored data has been stored by a previously restored file. By making use of the CBMAP during the restoration process, storage of duplicate file data blocks on the volume may be avoided by sharing with a current file being restored a reference to the corresponding file data block previously stored on the volume and associated with the previously restored file. In addition to preserving storage efficiency, use of the CBMAP facilitates avoidance of repeated GET operations for data associated with CBNs previously retrieved from the cloud and stored to the volume, thereby reducing data access costs as well as latency of the restore operation.

20 Claims, 9 Drawing Sheets

(56) References Cited

U.S. PATENT DOCUMENTS

| | | |
|---|---|---|
| 2015/0269032 A1 | 9/2015 | Muthyala et al. |
| 2016/0170823 A1 | 6/2016 | Miller et al. |
| 2016/0210306 A1 | 7/2016 | Kumarasamy et al. |
| 2016/0283501 A1 | 9/2016 | König et al. |
| 2017/0123935 A1 | 5/2017 | Pandit et al. |
| 2017/0249349 A1* | 8/2017 | Bhat .................. G06F 16/2365 |
| 2017/0262520 A1 | 9/2017 | Mitkar et al. |
| 2018/0121453 A1 | 5/2018 | Jain et al. |
| 2018/0124174 A1 | 5/2018 | Swallow et al. |
| 2018/0196831 A1 | 7/2018 | Maybee et al. |
| 2018/0196832 A1* | 7/2018 | Maybee .............. G06F 11/1004 |
| 2019/0163580 A1 | 5/2019 | Pandey et al. |
| 2020/0183602 A1 | 6/2020 | Kabra et al. |
| 2020/0285410 A1* | 9/2020 | George ................. G06F 3/0644 |
| 2022/0138207 A1* | 5/2022 | Yelheri ............... G06F 11/2094 |
| | | 707/722 |

OTHER PUBLICATIONS

Stender J., "Snapshots in Large-Scale Distributed File Systems," Sep. 14, 2012, pp. 1-139. URL: https://d-nb.info/1030313644/34.

* cited by examiner

PRESERVING STORAGE EFFICIENCY DURING RESTORATION OF DATA FROM THE CLOUD TO A DATA STORAGE SYSTEM

BACKGROUND

Field

Various embodiments of the present disclosure generally relate to an approach for preserving storage efficiency during restoration of data from the cloud. In particular some embodiments relate to performing deduplication of data blocks during recovery of data to a data storage system node from a snapshot persisted within an object store of a cloud.

Description of the Related Art

Many users utilize cloud computing environments to store data, host applications, etc. A client device may connect to a cloud computing environment in order to transmit data from the client device to the cloud computing environment for storage. The client device may also retrieve data from the cloud computing environment. In this way, the cloud computing environment can provide scalable low cost storage.

Some users and businesses may use or deploy their own primary storage systems such as clustered networks of nodes (e.g., storage controllers) for storing data, hosting applications, etc. A primary data storage system may provide robust data storage and management features, such as data replication, data deduplication, encryption, backup and restore functionality, snapshot creation and management functionality, incremental snapshot creation, etc. However, storage provided by such primary storage systems can be relatively more costly and less scalable compared to cloud computing storage. Thus, cost savings and scalability can be achieved by using a hybrid of primary storage systems and remote cloud computing storage. Unfortunately, the robust functionality provided by primary data storage systems is not compatible with cloud computing storage, and thus these features are generally lost.

Some primary data storage systems are able to maintain data deduplication by utilizing an object file system to store, retrieve, and manage objects within an object store (e.g., a Simple Storage Service (S3) object storage service) of a cloud computing environment. For example, cloud block numbers (CBNs) (e.g., cloud physical volume block numbers) may be used to uniquely represent data (e.g., a block's worth of information) in the object store at any point in time. A CBN may be used to derive a corresponding object name (e.g., a sequence number), and vice versa. The object file system may allow for sharing of cloud blocks, thereby providing for storage space efficiency across files so that deduplication and compression used by the source computing device can be preserved.

Such an object file system may be capable of representing data (e.g., a volume, a file, a directory, an image, a storage virtual machine, a logical unit number (LUN), application data, backup data, metadata, database data, a virtual machine disk, etc.) residing in any type of computing device (e.g., a computer, a laptop, a wearable device, a tablet, a storage controller, a node, an on-premise server, a virtual machine, another object store or cloud computing environment, a hybrid storage environment, data already stored within the object store, etc.) in the object store in a structured format while preserving storage efficiency.

For example, CBNs may be used to uniquely represent data (e.g., a block's worth of information from the source computing device) in the object store at any point in time. A CBN may be used to derive a corresponding object name (e.g., a sequence number), and vice versa. The object file system may allow for sharing of cloud blocks, thereby providing for storage space efficiency across files so that deduplication and compression used by the computing device can be preserved.

By representing backup data (e.g., associated with snapshots) as a file system in the object store, the data of the objects can be accessed and mounted on-demand by remote computing devices, thereby providing the ability to access snapshot data universally for whomever has access to the object format of the object file system. Snapshots in the object store may be self-representing, and the object file system may provide access to a complete snapshot without having to access other snapshots.

SUMMARY

Systems and methods are described for preserving storage efficiency during restoration of data from the cloud. According to one embodiment, the data is restored from an object store of the cloud to a volume of a data storage system. The data storage system maintains a cloud block map (CBMAP) having entries that each map a cloud block number (CBN) of multiple CBNs to a corresponding block number of the volume. The portion of the data associated with a given CBN represents data that was previously retrieved from the object store and stored within a given file data block of the volume that is identified by the corresponding block number. Storage efficiency may then be preserved during the ongoing restoration by: (i) prior to issuing a request for a particular portion of the data associated with a particular CBN from the object store, determining the particular CBN is present within an entry of the CBMAP that is valid; and (ii) responsive to the determination, avoiding storing a duplicate file data block on the volume containing the particular portion of the data by instead storing a reference to the given file data block identified by the block number corresponding to the particular CBN.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
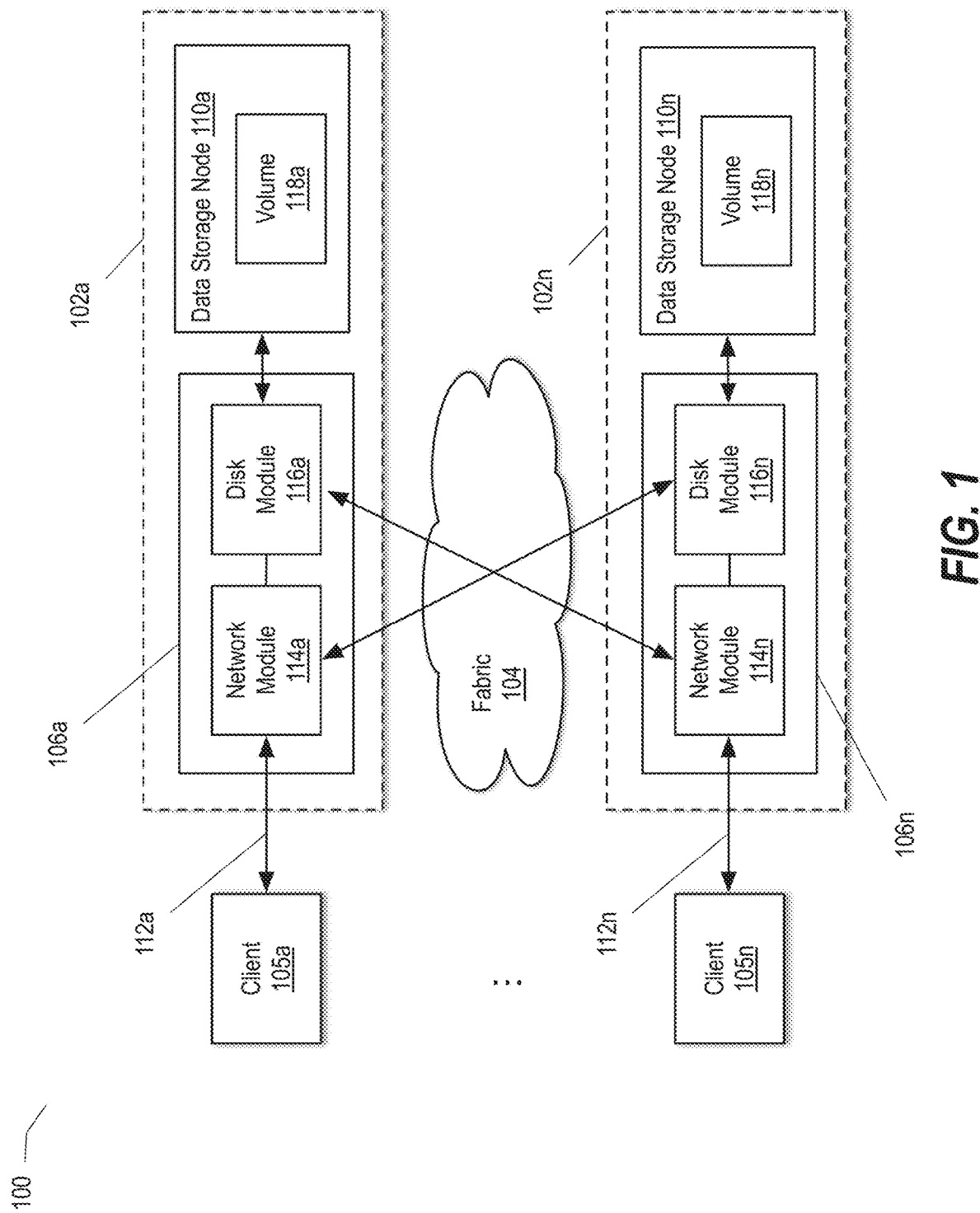
FIG. 1 is a block diagram illustrating an example clustered network in which various embodiments of the present disclosure may be implemented.

Systems and methods are described for preserving storage efficiency during restoration of data from the cloud. As noted above, some primary data storage systems are able to maintain data deduplication when backing up data to an object store of a cloud computing environment. However, during performance of a cloud restore process, the deduplicated data is pulled separately via individual application programing interface (API) calls (e.g., GET operations) from the snapshot at issue and is written to a local volume in separate data blocks, thereby losing the storage efficiency and issuing a number of repeated API calls for deduplicated data.

Embodiments described herein seek to address or at least mitigate various of the inefficiencies currently associated with performing a cloud restore operation. In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability and mobility (e.g., cloud bursting for load balancing between clouds).

As used herein, a "data storage system" or "storage appliance" generally refers to a type of computing appliance or node, in virtual or physical form, that provides data to, or manages data for, other computing devices or clients (e.g., applications). The storage system may be part of a cluster representing a distributed storage system. In various examples described herein, a storage system may be run (e.g., on a virtual machine (VM) or as a containerized instance, as the case may be) within a public cloud provider.

As used herein a "snapshot" generally refers to a file representing a point-in-time image of a dataset (e.g., a volume) containing metadata (e.g., that points to or otherwise identifies the underlying data) instead of including a copy of the underlying data. A non-limiting example of a snapshot is a NetApp snapshot copy.

Example Clustered Network

FIG. 1 is a block diagram illustrating an example clustered network 100 or a network storage environment in which various embodiments of the present disclosure may be implemented. In the context of the present example, the clustered network environment 100 is shown including data storage systems 102a-n that may be coupled via a cluster fabric 104, such as a computing network embodied as a private Infiniband, Fibre Channel (FC), or Ethernet network facilitating communication between the data storage systems 102a-n (and one or more modules, component, etc. therein, such as, nodes 114a-n and 116a-n, for example). It is to be appreciated that while two data storage systems 102a and 102n and two nodes 106a and 106n are illustrated in FIG. 1, any suitable number of such components is contemplated. In an example, nodes 106a and 106n comprise storage controllers (e.g., node 116a may comprise a primary or local storage controller and node 116n may comprise a secondary or remote storage controller) that provide client devices, such as host devices 105a-n, with access to data stored within data storage devices (e.g., data storage nodes 110a-n). Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in an embodiment a clustered network can be distributed over multiple storage systems and/or nodes located in multiple geographic locations; while In an embodiment a clustered network can include data storage systems (e.g., 102a and 102n) residing in the same geographic location (e.g., in a single onsite rack of data storage devices).

In the illustrated example, one or more host devices 105a-n which may comprise, for example, client devices, personal computers (PCs), computing devices used for storage (e.g., storage servers), and other computers or peripheral devices (e.g., printers), are coupled to the respective data storage systems 102a-n by storage network connections 112a-n. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol (e.g., S3 or the like). Illustratively, the host devices 105a-n may be general-purpose computers running applications, and may interact with the data storage systems 102a-n using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112a-n.

The nodes 106a-n of clustered data storage systems 102a-n can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes, such as the nodes 106a-n (e.g., a first set of storage controllers configured to provide access to a first storage aggregate comprising a first logical grouping of one or more storage devices) may be located on a first storage site. A second cluster of nodes (not shown) may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 106a-n can comprise various functional components that coordinate to provide distributed storage architecture for the cluster. For example, the nodes can include respective network modules 114a-n and respective disk modules 116a-n. Network modules 114a-n can be configured to allow the nodes 106a-n (e.g., network storage controllers) to connect with host devices 105a-n over the storage network connections 112a-n, for example, allowing the host devices 105a-n to access data stored in the distributed storage system. Further, the network modules 114a-n can provide connections with one or more other components through the cluster fabric 104. For example, in FIG. 1, the network module 114a of node 106a can access a second data storage device by sending a request through the disk module 116n of node 106n.

Disk modules 116a-n can be configured to connect one or more data storage devices 110a-n, such as disks or arrays of disks, flash memory, or some other form of data storage, to the nodes 106a-n. The nodes 106a-n can be interconnected by the cluster fabric 104, for example, allowing respective nodes in the cluster to access data on data storage devices 102a-n connected to different nodes in the cluster. Often, disk modules 116a-n communicate with the data storage devices 110a-n according to a SAN protocol (e.g., SCSI or FCP), for example. Thus, as seen from an operating system on nodes 106a-n, the data storage devices 110a-n can appear as locally attached to the operating system. In this manner, different nodes 106a-n, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be multiple network and disk modules interconnected in a cluster that does not have a one-to-one correspondence between the network and disk modules. That is, different nodes can have a different number of network and disk modules, and the same node can have a different number of network modules than disk modules.

Further, a host device 105a-n can be networked with the nodes 106a-n in the cluster, over the storage networking connections 112a-n. As an example, respective host devices 105a-n that are networked to a cluster may request services (e.g., exchanging of information in the form of data packets) of nodes 106a-n in the cluster, and the nodes 106a-n can return results of the requested services to the host devices 105a-n. In an embodiment, the host devices 105a-n can exchange information with the network modules 114a-n residing in the nodes 106a-n (e.g., network hosts) in the data storage systems 102a-n.

In an embodiment, the data storage devices 110a-n include volumes 118a-n, which is an implementation perform storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 105a-n can utilize the data storage systems 102a-n to store and retrieve data from the volumes 118a-n. In this embodiment, for example, the host device 105a can send data packets to the network module 114a in the node 106a within data storage system 102a. The node 106a can forward the data to the data storage device 110a using the disk module 116a, where the data storage device 110a comprises volume 118a. In this way, in this example, the host device can access the volume 118a, to store and/or retrieve data, using the data storage system 102a connected by the storage network connection 112a. Further, in this embodiment, the host device 112n can exchange data with the network module 114n in the node 106n within the data storage system 102n (e.g., which may be remote from the data storage system 102a). The node 106n can forward the data to the data storage device 110n using the disk module 116n, thereby accessing volume 118n associated with the data storage device 110n.

It may be appreciated that managing objects within an object store using an object file system may be implemented within the clustered network environment 100, such as where nodes within the clustered network environment store data as objects within a remote object store (e.g., an object store of a cloud). It may be appreciated that managing objects within an object store using an object file system may be implemented for and/or between any type of computing environment, and may be transferrable between physical devices (e.g., node 106a, node 106b, a desktop computer, a tablet, a laptop, a wearable device, a mobile device, a storage device, a server, etc.) and/or a cloud computing environment (e.g., remote to the clustered network environment 100).

While clustered network environment 100 is one example of an environment in which embodiments may be implemented, it is to be appreciated that the techniques, etc. described herein may be implemented within a non-cluster network environment, and/or a variety of other computing environments, such as a desktop computing environment. That is, the instant disclosure, including the scope of the appended claims, is not meant to be limited to the examples provided herein.

It is to be appreciated where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

Example Data Storage System Node

Figure 2:
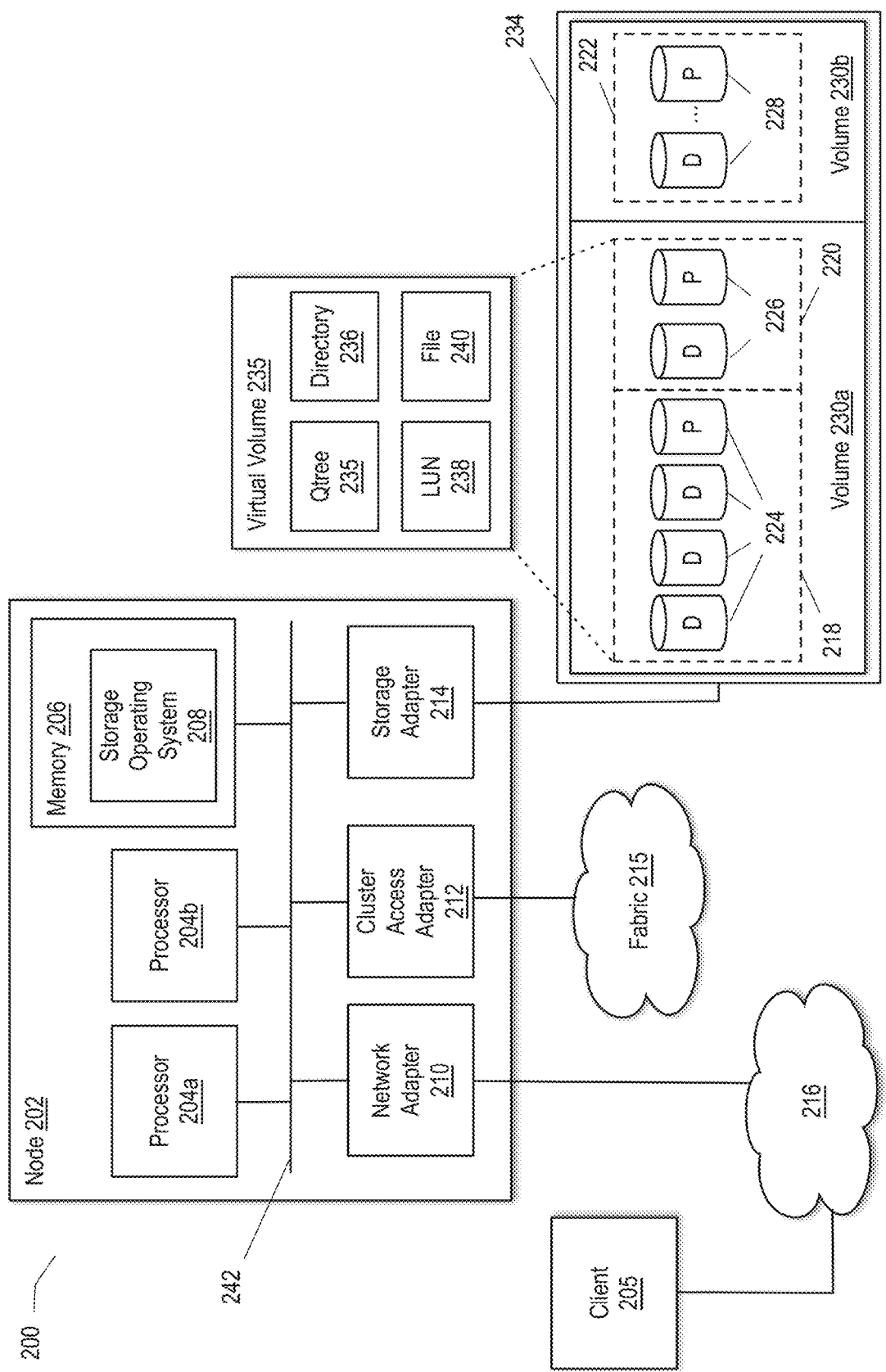
FIG. 2 is a block diagram illustrating an example data storage system in which various embodiments of the present disclosure may be implemented.

FIG. 2 is a bock diagram illustrating an example data storage system 200 in which various embodiments of the present disclosure may be implemented. In the context of the present example, data storage system 200 (which may be analogous to nodes 102a-n of FIG. 1), shows further detail of components that may implement one or more of the techniques and/or systems described herein in accordance with an embodiment. The data storage system 200 comprises a node 202 (which may be analogous to nodes 106a-n of FIG. 1), and a data storage device 234 (which may be analogous to data storage nodes 110a-n of FIG. 1). The node 202 may be a general purpose computer, for example, or some other computing device particularly configured to operate as a storage server. A host device 205 (which may be analogous to one of clients 105a-n of FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 may include mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204a-b, a memory 206, a network adapter 210, a cluster access adapter 212, and a storage adapter 214 interconnected by a system bus 242. The data storage system 200 also includes an operating system (e.g., storage operating system 208) installed in the memory 206 of the node 202 that can, for example, implement a Redundant Array of Independent (or Inexpensive) Disks (RAID) optimization technique to optimize a reconstruction process of data of a failed disk in an array.

The operating system can also manage communications for the data storage system 200, and communications between other data storage systems that may be in a clustered network, such as attached to a cluster fabric 215 (which may be analogous to fabric 104 of FIG. 1). Thus, the node 202, such as a network storage controller, can respond to host device requests to manage data on the data storage device 234 (e.g., or additional clustered devices) in accordance with these host device requests. The operating system can often establish one or more file systems on the data storage system 200, where a file system can include software code and data structures that implement a persistent hierarchical namespace of files and directories, for example. As an example, when a new data storage device (not shown) is added to a clustered network system, the operating system is informed where, in an existing directory tree, new files associated with the new data storage device are to be stored. This is often referred to as "mounting" a file system.

In the example data storage system 200, memory 206 can include storage locations that are addressable by the processors 204a-b and adapters 210, 212, 214 for storing related software application code and data structures. The processors 204 and adapters 210, 212, 214 may, for example, include processing elements and/or logic circuitry configured to execute the software code and manipulate the data structures. The operating system, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204a-b (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230a-b (which may be analogous to volumes 118a-n of FIG. 1) that are comprised of a cluster of disks 224, 226, 228 defining an overall logical arrangement of disk space. The disks 224, 226, 228 that comprise one or more volumes are typically organized as one or more groups of RAIDs. As an example, volume 230a comprises an aggregate of disk arrays 218 and 220, which comprise the cluster of disks 224 and 226.

In an embodiment, to facilitate access to disks 224, 226, 228, the operating system may implement a file system (e.g., a write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a RAID system). Typically, the location of the physical volume doesn't change in that the (range of) address(es) used to access it generally remains constant.

A virtual volume (e.g., virtual volume 235), in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume (e.g., volume 230a-b) through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that managing objects within an object store using an object file system may be implemented for the data storage system 200. It may be appreciated that managing objects within an object store using an object file system may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Example Cloud Environment

Figure 3:
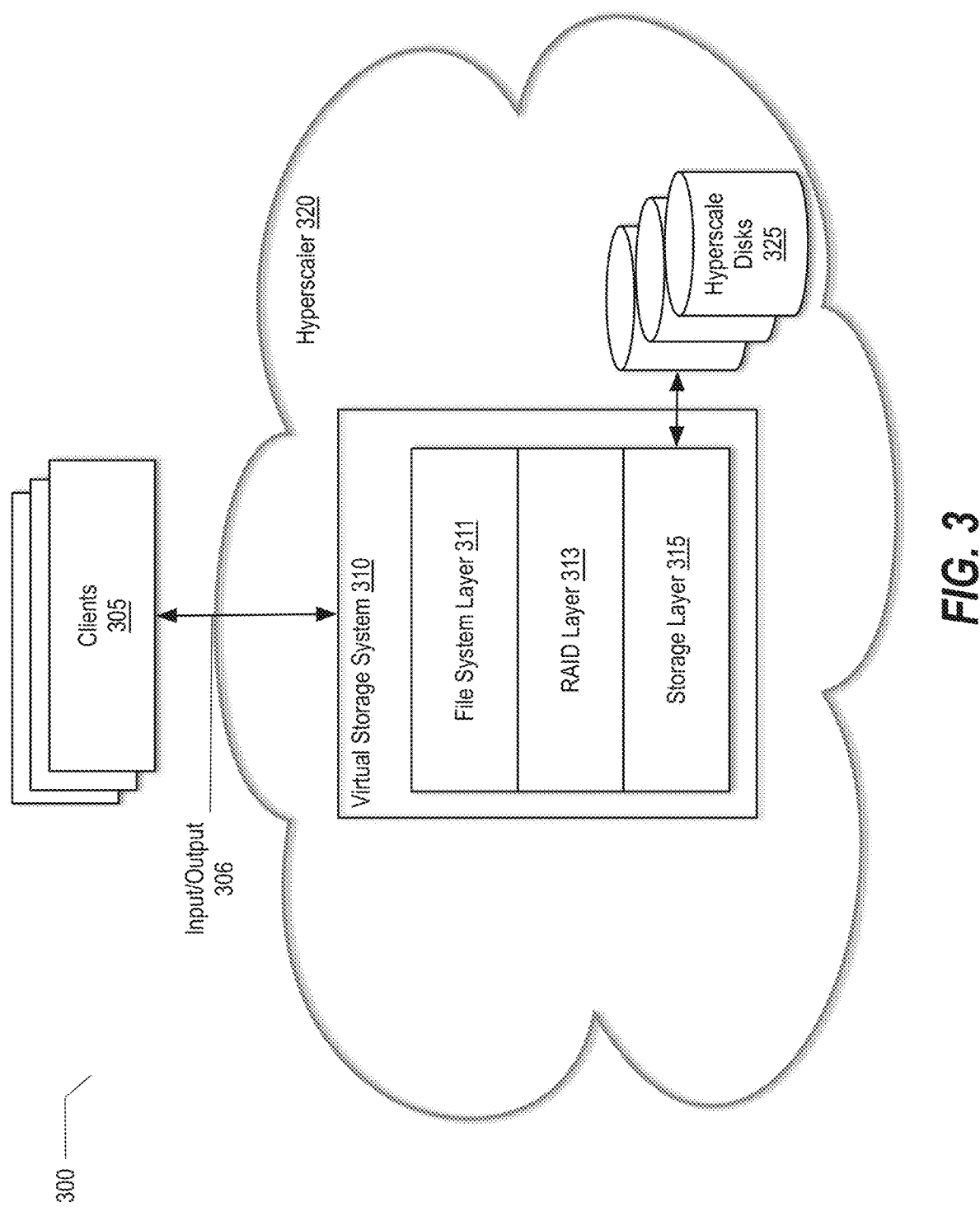
FIG. 3 is a block diagram illustrating an example cloud environment in which various embodiments may be implemented.

FIG. 3 is a block diagram illustrating an example cloud environment (e.g., hyperscaler 320) in which various embodiments may be implemented. In the context of the present example, a virtual storage system 310 (which may be a software implemented version of one of nodes 106a-b of FIG. 1) may be run (e.g., within a VM or in the form of one or more containerized instances, as the case may be) within a public cloud provided by a public cloud provider (e.g., hyperscaler 320). In this example, the virtual storage system 310 makes use of storage (e.g., hyperscale disks 325) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks), which may be analogous to discus 224, 226, and 228.

The virtual storage system 310 may present storage over a network to clients 305 (which may be analogous to clients 105 and 205) using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 305 may request services of the virtual storage system 310 by issuing Input/Output requests 306 (e.g., file system protocol messages (in the form of packets) over the network). A representative client of clients 305 may comprise an application, such as a database application, executing on a computer that "connects" to the virtual storage system 310 over a computer network, such as a point-to-point link, a shared local area network (LAN), a wide area network (WAN), or a virtual private network (VPN) implemented over a public network, such as the Internet.

In the context of the present example, the virtual storage system 310 is shown including a number of layers, including a file system layer 311 and one or more intermediate storage layers (e.g., a RAID layer 313 and a storage layer 315). These layers may represent components of data management software or storage operating system (e.g., storage operating system 208) of the virtual storage system 310. The file system layer 311 generally defines the basic interfaces and data structures in support of file system operations (e.g., initialization, mounting, unmounting, creating files, creating directories, opening files, writing to files, and reading from files). A non-limiting example of the file system layer 311 is the Write Anywhere File Layout (WAFL) Copy-on-Write file system (which represents a component or layer of ONTAP software available from NetApp, Inc. of San Jose, CA).

The RAID layer 313 may be responsible for encapsulating data storage virtualization technology for combining multiple hyperscale disks 325 into RAID groups, for example, for purposes of data redundancy, performance improvement, or both. The storage layer 315 may include storage drivers for interacting with the various types of hyperscale disks 325 supported by the hyperscaler 320. Depending upon the particular implementation the file system layer 311 may persist data to the hyperscale disks 325 using one or both of the RAID layer 313 and the storage layer 3115.

The various layers described herein, and the processing described below may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 9 below.

Example Backup Relationship

Figure 4:
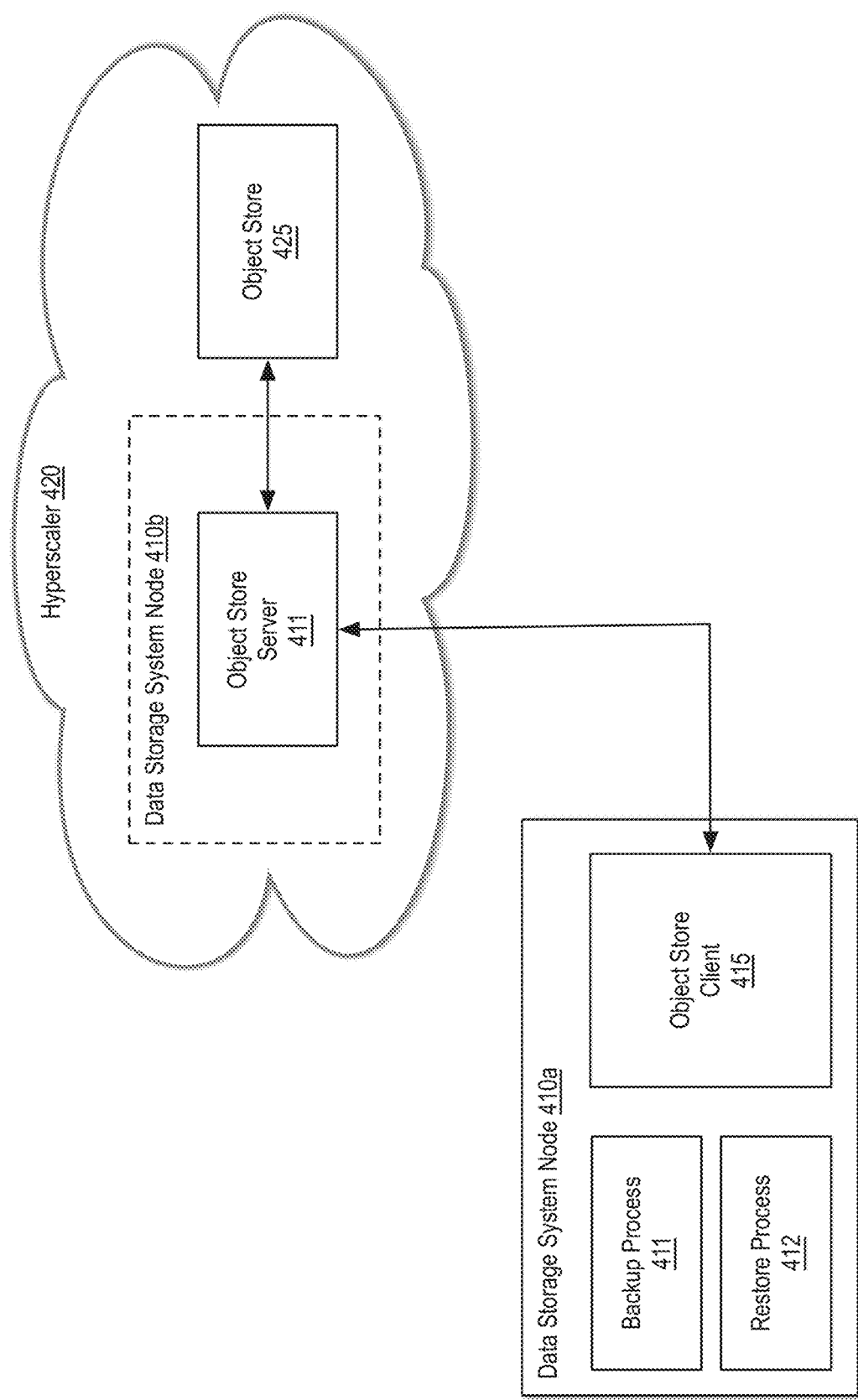
FIG. 4 is a block diagram illustrating an example of a first data storage system instance that may have a backup relationship with a second data storage system instance in accordance with an embodiment of the present disclosure.

FIG. 4 is a block diagram illustrating an example of a first data storage system instance (e.g., data storage system node 410a) that may have a backup relationship with a second data storage system instance (e.g., data storage system node 410b) in accordance with an embodiment of the present disclosure. In various examples described herein, it is assumed data managed by one instance of a data storage system (e.g., data storage system node 410a) has been backed up (e.g. via back up process 411 and object store client 415) to object store 425 (e.g., an object storage service) potentially via a backup relationship with another instance of a data storage system (e.g., data storage system node 410b) or with the object store 425. For example, object store 425 may have stored therein objects including one or more snapshots representing point-in-time snapshots of all or some portion of a file system of the data storage system node 410a. Depending on the particular implementation, individual objects store in the object store 425 may store individual blocks or objects may have a structured format in which multiple blocks may be stored within respective slots of a given object, for example, as described in U.S. Pat. Nos. 10,852,976 and 11,144,502, both of which are hereby incorporated by reference in their entirety for all purposes. In the case of the former, cloud block numbers (CBNs) may be used to uniquely represent data (e.g., a block's worth of information from the source computing device) in the object store 425 at any point in time. A CBN may be used to derive (e.g., by object store client 415) a corresponding object name (e.g., a sequence number) and vice versa. The object file system may allow for sharing of cloud blocks, thereby providing for storage space efficiency across files so that deduplication and compression used by the source computing device can be preserved. In the case of the latter, CBNs may be used to uniquely represent data (e.g., multiple blocks' worth of information from the source computing device) in the object store 425 at any point in time. In this case, a CBN may be used to derive (e.g., by object store client 415) a corresponding object name (e.g., a sequence number) and an index (e.g., a slot number of a slot within that object) that may be used by the object store server 411 to access the object store 425.

In the context of various examples described herein, it is assumed a first data storage system node (e.g., data storage system node 410a, which may be analogous to one of data storage systems 102a-n or virtual storage system 310) has a backup relationship with the object store 425 directly or indirectly via a second data storage system node (e.g., data storage system node 410b, which may be analogous to virtual storage system 310). It may also be assumed, the first data storage system node performed data deduplication when backing up data to object store 425. As noted above, storage efficiency may be lost by existing data storage systems during performance of a cloud restore process (e.g., restore process 412), for example, to restore a volume, a file, a directory, etc. to a local volume as a result of the deduplicated data being pulled separately via individual GET operations from the snapshot at issue and then being written to a local volume in separate data blocks.

In various examples described herein a restore process (e.g., restore process 412) implemented by data storage system node 410a maintains storage efficiency during recovery of data from a snapshot persisted within the object store 425 by maintaining the data deduplication performed during the backup process. For example, as described further below with reference to FIGS. 5, 6, and 8, a cloud block map (CBMAP) metafile (not shown) may be used to maintain a mapping of CBNs previously retrieved from the cloud during a given restore operation to a corresponding block number of the local volume to which the data is being restored, thereby allowing deduplicated blocks to be read only once from the cloud and also allowing a single copy of such deduplicated blocks to be stored on the local volume regardless of the number of recovered files that may include the data contained within such deduplicated blocks.

High-Level Restore Processing

Figure 5:
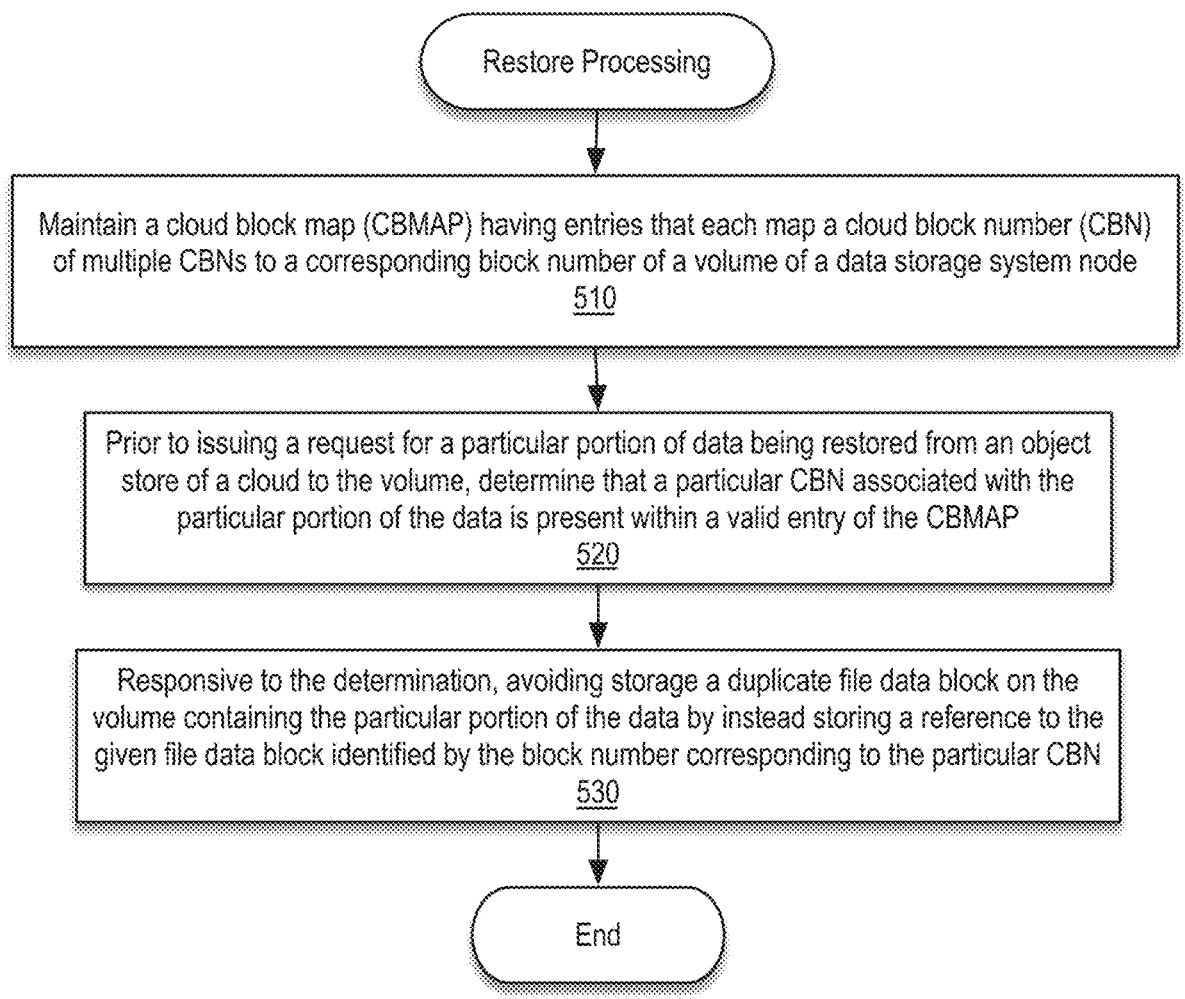
FIG. 5 is a high-level flow diagram illustrating a set of operations for performing restore processing in accordance with an embodiment of the present disclosure.

FIG. 5 is a high-level flow diagram illustrating a set of operations for performing restore processing in accordance with an embodiment of the present disclosure. The processing described with reference to FIG. 5 may be performed by a data storage system node (e.g., data storage system 102a or 102n, virtual storage system 310, or data storage system node 410a) to restore data (e.g., during a restore operation, such as restore process 412) to a local volume (e.g., volume 235 or volume 230a) previously backed up by the same data storage system or another data storage system to an object store (e.g., object store 425) of a cloud (e.g., hyperscaler 320 or 420).

At block 510, a cloud block map (CBMAP) is maintained by the data storage system node, which may be part of a cluster of data storage system nodes that collectively represent a distributed storage system. The CBMAP may be stored as a metafile within a virtual volume (e.g., virtual volume 235) and may be created within the virtual volume while setting up for a given restore operation. The CBMAP may include a number of entries that each map a CBN of multiple CBNs to a reference (e.g., a volume block number (VBN), a VBN pair, or a pointer) to a corresponding data block of a local volume to which the data is being restored. According to one embodiment, as CBNs are retrieved from the object store, the CBMAP entries may be populated, for example, with a corresponding VBN pair (e.g., a virtual volume block number (VVBN) within a virtual volume (e.g., virtual volume 235) and a physical volume block number (PVBN) within a physical volume (e.g., volume 230a)). After successful completion of the given restore operation, the VVBNs in the CBMAP may be freed.

Storage efficiency may be preserved during the restore operation by performing blocks 520 and 530. At block 520, prior to issuing a request (e.g., a GET request) for a particular portion of the data being restored from the object store to the local volume, it may be determined that a particular CBN associated with the particular portion of the data is present within a valid entry of the CBMAP. In one embodiment, the presence of a valid entry of the CBMAP having a given CBN is indicative of the given CBN having previously been read from the object store of the cloud during the restore operation and having previously been stored within a given file data block of the volume. As described further below, in some embodiments, entries of the CBMAP may be pending or valid. Entries of the CBMAP marked as pending (e.g., having a pending flag set to true), do not yet include information regarding the corresponding VBN or VBN pair for the CBN, whereas entries of the CBMAP marked as valid (e.g., having a pending flag is set to false) include valid information regarding the corresponding VBN or VBN pair for the CBN.

At block 530, responsive to the determination at block 520 that the particular CBN is present within a valid entry of the CBMAP, storage of a duplicate file data block on the volume containing the particular portion of the data may be avoided by sharing with the current file a reference (e.g., one or more of the corresponding VVBN and the PVBN or a pointer) to the corresponding file data block previously stored on the volume, thereby allowing the current file to store the reference to the file data block previously stored. In addition to preserving storage efficiency, repeated GET operations may be avoided for data associated with CBNs previously retrieved from the cloud and stored to the volume. In addition to achieving storage efficiency, avoiding such repeated GET operations reduces data access costs as well as latency of the restore operation.

While in the context of various examples described herein a VBN or a VBN pair (e.g., a VVBN and a PVBN) may be used to reference a given data block stored on a given volume, it is to be appreciated other direct or indirect references may be used depending on the particular implementation. For example, some implementations may utilize pointers to reference data blocks.

In the context of the present example, various complexities associated with a multi-phase file system and how various operations on the CBMAP may be distributed across file system processing and consistency point (CP) processing, have been avoided for purposes of simplicity. Additional details regarding an exemplary restore process are described below with reference to FIGS. 6 and 8.

Example File System and Consistency Point Processing

Figure 6:
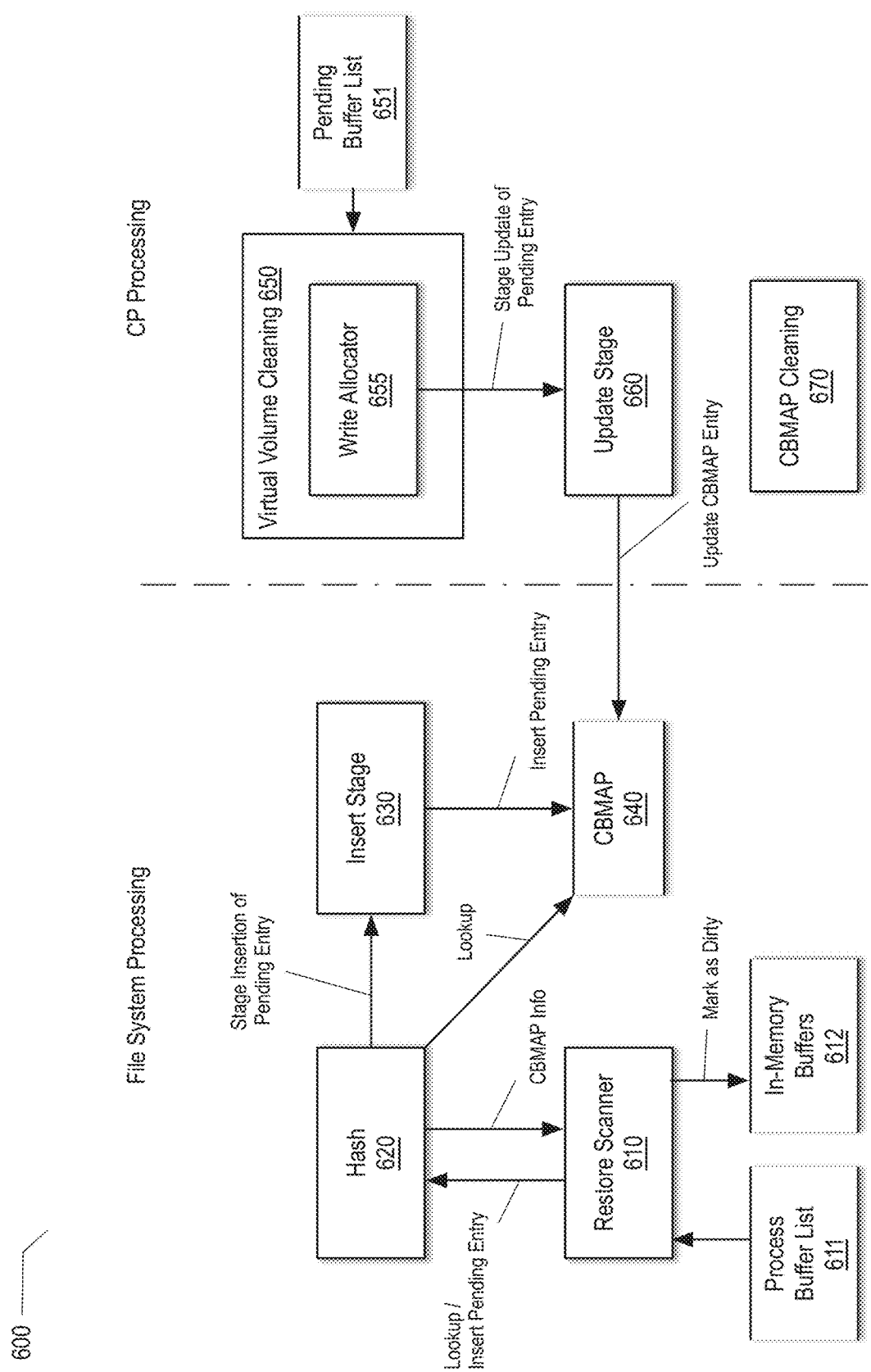
FIG. 6 is a block diagram illustrating examples of various components, processing, and stages that may be distributed between file system processing and consistency point processing in accordance with an embodiment of the present disclosure.

FIG. 6 is a block diagram illustrating examples of various components, processing, and stages that may be distributed between file system processing and consistency point (CP) processing in accordance with an embodiment of the present disclosure. Some file systems (e.g., multi-phase file systems or write-anywhere file systems, such as the proprietary Write Anywhere File Layout (WAFL) copy-on-write file system available from NetApp, Inc. of San Jose, CA), perform multiple phases (e.g., load and modify) before data associated with a write operation is written to disk. For example, during the load phase for a write operation, file system data (e.g., inodes) may be loaded from disk into memory at which point they are referred to as "buffers.". Thereafter, lock (if applicable), modify, and resize (if applicable) phases may be performed in sequence.

In file systems that write data in place, data is assigned a block only once. However, copy-on-write file systems, such as WAFL, log-structured file system (LFS), ZFS (previously, Zettabyte File System), and B-Tree Filesystem (BTRFS), allocate blocks for every incoming write. That is, even overwritten data results in write allocation because all data is written to a new location.

WAFL may accumulate and flush thousands of operations worth of data to persistent storage, which allows better layout decisions and amortizes the associated overhead. Instead of delaying the client reply until the data reaches persistent storage as part of the next batch, operations that update file system state are logged in nonvolatile RAM, which allows the system to reply to client writes very quickly. Writing a consistent collection of changes as a single transaction in WAFL is known as a consistency point, or simply a CP. Each CP is a self-consistent point-in-time image of the file system that includes updates since the previous CP. Therefore, in-memory data that is to be included in a CP is atomically identified at the start of the CP and isolated from further modifications until the data reaches persistent storage. Writing to a file "dirties" the in-memory inode (or "buffer") associated with the file and adds it to a list of dirty inodes to process in the next CP. Since the WAFL file system stores all metadata as files, the primary function of a CP is to flush changed state (i.e., all dirty buffers) from each dirty inode to persistent storage, which is known as inode cleaning. Each dirty buffer is cleaned by allocating a free block, writing the buffer to this chosen location, and freeing the previously used block.

Once all dirty inodes for files and metafiles have been cleaned, the newly written data is atomically persisted by overwriting the superblock (the root inode) in place. If the system crashes before the superblock is written, the file system state from the most recently completed CP may be loaded and all subsequent operations may be replayed from the log stored in nonvolatile RAM.

FIG. 6 represents an example distribution of processing 600 between file system processing and CP processing that may be useful for implementing a cloud restore operation of data in a multi-phase file system while also maintaining the storage efficiency achieved during a prior backup process of the data. In the context of the present example, the file system processing includes a restore scanner 610, a hash module 620, an insert stage 630, and a CBMAP 640.

In one embodiment, the CBMAP 640 may be created/initialized by a data storage system (e.g., data storage system 102a or 102n, virtual storage system 310, or data storage system node 410a) responsive to the start of the performance of a restore operation by the data storage system, for example, to recover data (e.g., representing a full volume, a directory, multiple files, a single file, etc.) from the cloud that was previously backed up to the cloud. As data associated with CBNs are retrieved from the cloud, an entry may be added to the CBMAP 640 for each CBN and populated with a corresponding VBN (or VBN pair) to facilitate data deduplication by sharing the corresponding VBN with another file that may contain the same data. As such, the presence of an entry within the CBMAP 640 is indicative of the file data block associated with the given CBN having already been retrieved from the cloud during the current restore operation and having been stored to a file data block (identified by the given VBN) on a local volume of the data storage system.

According to one embodiment, the CBMAP 640 is represented in the form of a V+ tree (e.g., a special B+ tree with support for variable length key and payload so a key can be sized according to a type of entry being stored for optimization). The key may uniquely represent all types of entries associated with a block number (e.g., a CBN). The key may comprise a field indicative of the number of block numbers contained within the entry (e.g., for handling compression groups (CGs) as described further below) and a list of one or more block numbers (e.g., the CBN(s)). The payload may include a field indicative of a number of references (e.g., VBN pairs, for example, each including a VVBN and a PVBN) and a list of the references. As described further below, in the context of a multi-phase file system, the updating of the CBMAP 640 may be staged to accommodate the separate load and modify phases. In addition to the mapping, The restore scanner 610 may be responsible for during each run, processing a batch of L1 blocks associated with a process buffer list 611, representing a list of user buffers that have been loaded into memory (e.g., within in-memory buffers 612) that are to be processed through the CBMAP 640 to perform deduplication for the current restore operation. In one embodiment, as described further below with reference to FIG. 8, when performing a lookup within the CBMAP 640 (which may also involve performing a lookup of staged entries not yet inserted into the CBMAP 640) for a given CBN of data being restored from the cloud, there are three potential outcomes. The first potential outcome is the CBN is not found, meaning the CBN has not been previously retrieved from the cloud during the current restore operation. The second potential outcome is the CBN is found within an entry of the CBMAP 640 (or staged for insertion into the CBMAP 640) that is marked as "pending" (e.g., a pending flag of the entry is set), meaning the corresponding VBN on the local volume has not yet been allocated and updated within the entry. The third potential outcome is the CBN is found within an entry of the CBMAP 640 that represents a valid entry (e.g., an entry in which the pending flag has been cleared), meaning the VBN on the local volume has been allocated and has been updated with the entry.

When the result of a lookup by the restore scanner 610 of a given CBN within the CBMAP 640 indicates the given CBN was not found, the restore scanner 610 may cause the block associated with the given CBN to be read from the cloud, mark the block as dirty within the in-memory buffers 612, and cause the hash module 620 to stage insertion of the pending entry (including setting the pending flag and adding the pending entry to the hash). When the result of the lookup indicates the given CBN was found within a pending entry, a shadow flag indicating the buffer needs to be processed through the CBMAP 640 may be set and the file identifier (ID) and the file block number may be recorded within a pending buffer list 651 to trigger allocation of the corresponding VBN on the local volume. When the result of the lookup indicates the given CBN was found within a valid entry, CBMAP information associated with the entry may be returned to the restore scanner 610 and the VBN may be shared for use by the current file being restored to maintain storage efficiency.

A pointer associated with a given buffer may be used to form an association between the given buffer and the corresponding CBMAP entry to allow the CBMAP information to be referenced during processing of the buffer. According to one embodiment, the CBMAP information includes the following:

- An ID of the volume (e.g., a volume file system ID (FSID)).
- The CBN representing the hash entry.
- A reference count, which is incremented for each buffer pointing to the hash entry.
- A flag to indicate whether the entry is a pending entry (or an in hash entry)
- A pointer or a reference (e.g., a VBN or a VBN pair) to a data block
- A CP count
- A sibling pointer, pointing to the next entry in case this entry is a composite entry.
- A head pointer, pointing to the head entry in case this entry is a composite entry.
- A non-composite pointer, pointing to the non-composite entry for the same CBN in case this entry is a composite entry.
- A pending count indicating how many CBMAP entries are pending allocation (1 for a non-composite entry, the size of the CG for a composite entry).

Since, in this example, entries are not directly inserted into the CBMAP 640, but rather are staged, the hash module 620 may be used to check if a pending entry for a given CBN has been staged for insertion (and has not yet been inserted into the CBMAP 640). In one embodiment, the lifecycle of a hash is the duration of one CP. In one embodiment, there may be two hashes for a given volume so as to allow work to happen for the next CP while the current CP is in progress.

The insert stage 630 may be responsible for inserting pending entries into the CBMAP 640 that were previously staged for insertion (including updating/incrementing a pending entry counter). In one embodiment, the insertion of pending entries into the CBMAP 640 is performed at times other than when the CBMAP metafile is in a CP. In implementations in which the CBMAP 640 is represented as a V+ file, insertions into the CBMAP 640, which may have variable length payload, may result in merges and/or splits. As such, precluding insertion operations during a CP allows dealing with such complexities to be avoided.

Turning now to the CP processing, it is shown including a virtual volume cleaning process 650, an update stage 660, and a CBMAP cleaning process 670. In the context of the present example, during virtual volume cleaning 650, the write allocator 655 is responsible for allocating a new reference, for example, a VBN pair (e.g., a VVBN and a PVBN) for each buffer in the pending buffer list 651 and staging an update of the corresponding pending entry within the CBMAP 640 via the update stage 660. The update stage 660 is responsible for updating the pending entry within the CBMAP 640 with which the buffer at issue is associated to include the newly allocated VBN pair. At this point, the pending entry may be removed from the hash 620, the pending entry counter may be decremented, the pending flag of the CBMAP entry may be reset/cleared (marking the CBMAP entry as a valid entry), and the shadow flag marking the buffer as needing to be processed via the CBMAP 640 may also be cleared.

The CBMAP cleaning 670 may be responsible for, during CP processing, allocating free blocks and writing dirty buffers of the CBMAP 640 metafile to the virtual volume.

Example File System Layout

Figure 7:
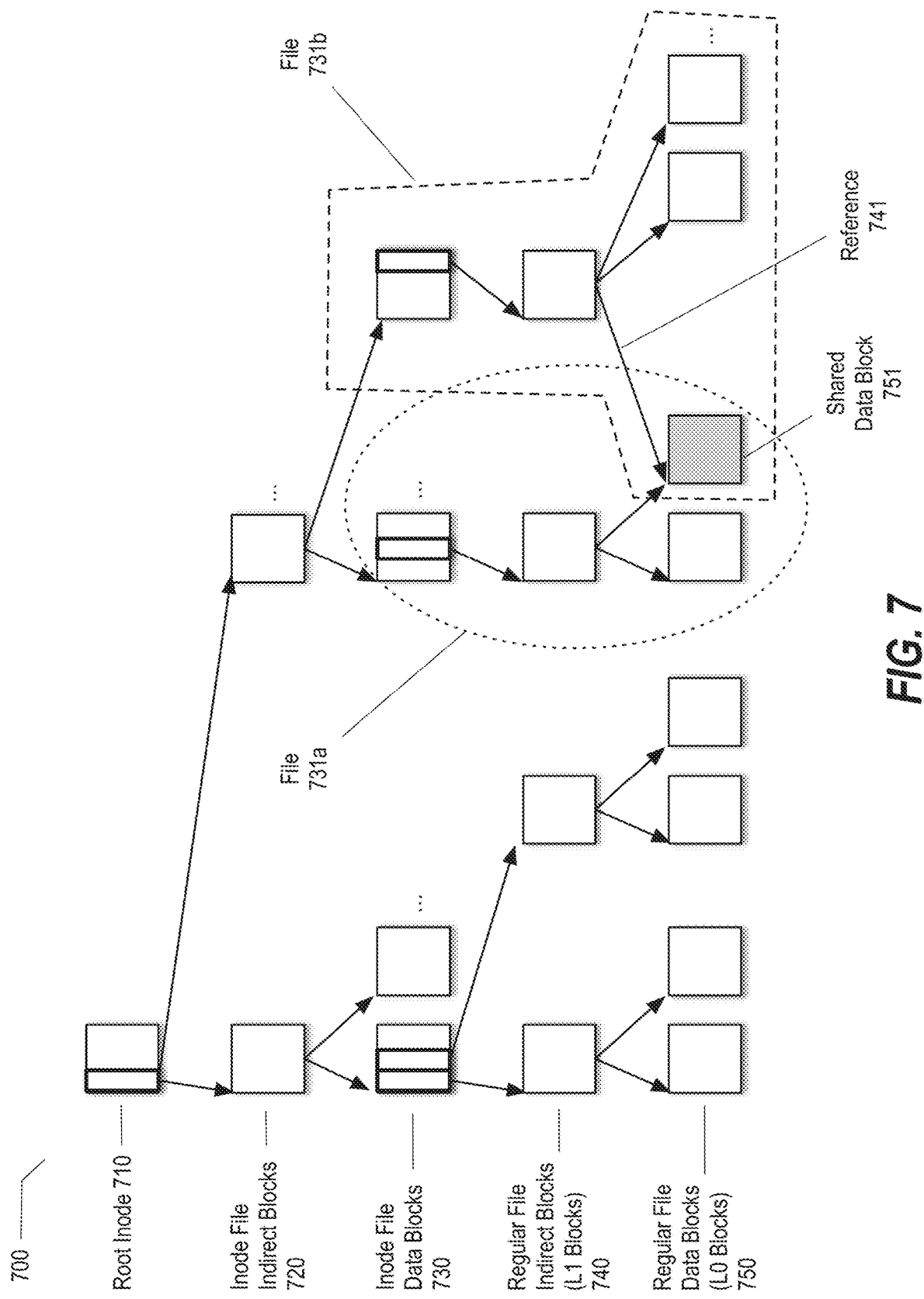
FIG. 7 is a block diagram illustrating a tree of blocks representing of an example a file system layout in accordance with an embodiment of the present disclosure.

FIG. 7 is a block diagram illustrating a tree of blocks 700 representing of an example a file system layout in accordance with an embodiment of the present disclosure. In one embodiment, the data storage system nodes (e.g., data storage systems 102a-n, virtual storage system 310, or data storage system node 410a) make use of a write anywhere file system (e.g., the write anywhere file layout (WAFL) file system available from NetApp, Inc. of San Jose, CA). The write anywhere file system may represent a UNIX compatible file system that is optimized for network file access. In the context of the present example, the write anywhere file system is a block-based file system that represents file system data (e.g., a block map file and an inode map file), meta-data files, and regular files in the tree of blocks 700. Keeping meta-data in files allows the file system to write meta-data blocks anywhere on disk and makes it easier to increase the size of the file system on the fly.

The tree of blocks 700 has a root inode 710, which describes the inode map file (not shown), made up of inode file indirect blocks 720 and inode file data blocks 730. In this example, the file system uses inodes (e.g., inode file data blocks 730) to describe files (e.g., file 731a and file 731b). In one embodiment, each inode contains 16 block pointers to indicate which blocks (e.g., of 4 KB) belong to a given file. Inodes for files smaller than 64 KB may use the 156 block pointers to point to file data blocks or simply data blocks (e.g., regular file data blocks 750, which may also be referred to herein as L0 blocks). Inodes for files smaller than 64 MB may point to indirect blocks (e.g., regular file indirect blocks 740, which may also be referred to herein as L1 blocks), which point to actual file data. Inodes for larger files may point to doubly indirect blocks. For very small files, data may be stored in the inode itself in place of the block pointers.

As noted above with reference to FIG. 5, in one embodiment, during a restore operation, when a particular CBN is present within a valid entry of the CBMAP (e.g., CBMAP 640), storage of a duplicate file data block on the volume containing a particular portion of the data being restored may be avoided by sharing a reference (e.g., reference 741), for example, in the form of a VBN, a VBN pair, or pointer, with a current file in the process of being restored (e.g., file 731b) to a file data block (e.g., shared data block 751) previously stored on the volume for a previously restored file (e.g., file 731a). In this manner, storage efficiency (e.g., data deduplication) may be achieved by the current file storing the reference to the shared data block 751 within a file indirect block rather than storing a duplicate file data block having the same content as the shared data block 751. Additionally, an API call to the cloud (e.g., a GET operation) to retrieve the particular CBN may be avoided, thereby reducing data access costs as well as latency of the restore operation.

Example Restore Processing

Figure 8:
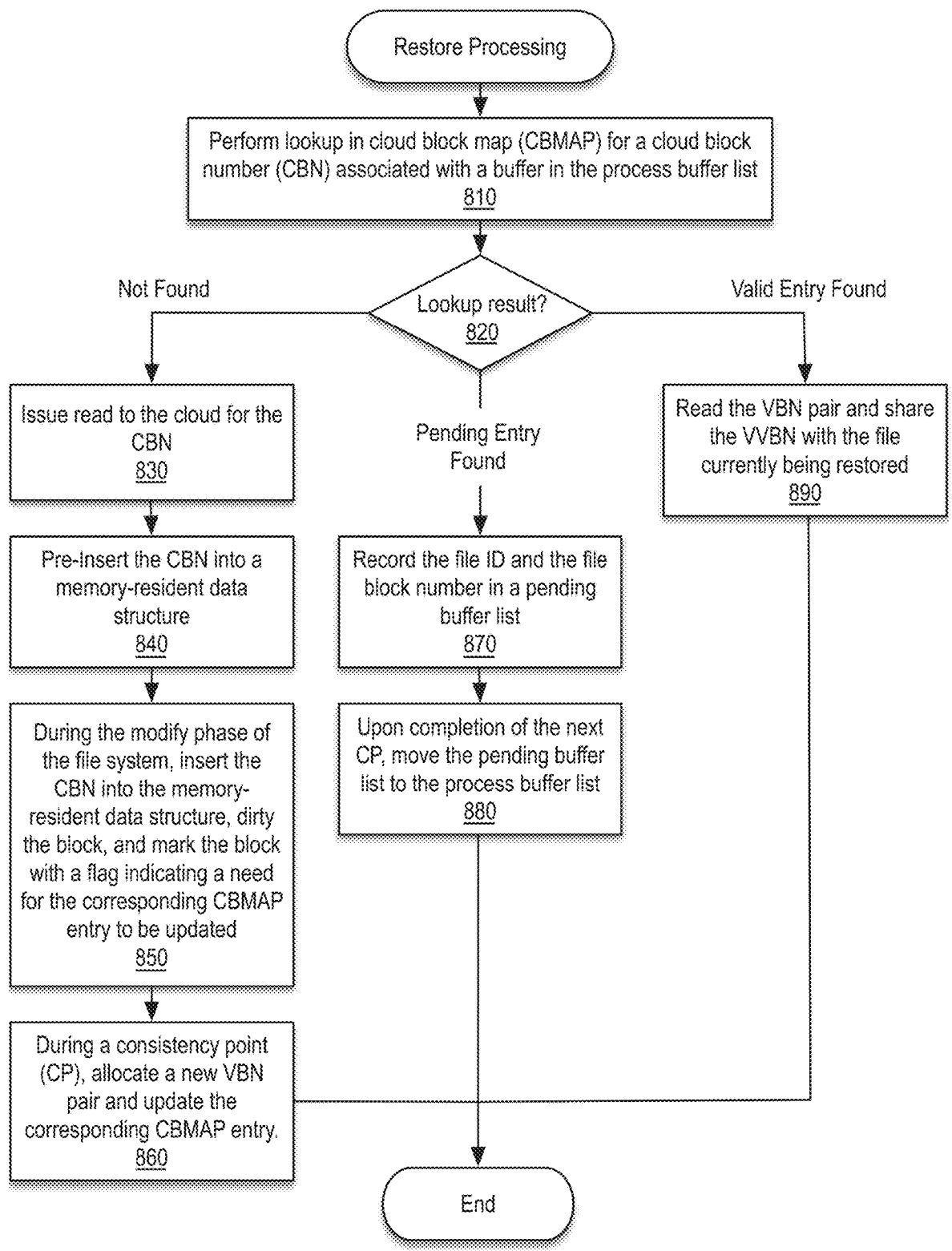
FIG. 8 is a flow diagram illustrating a set of operations for performing restore processing in accordance with an embodiment of the present disclosure.

FIG. 8 is a flow diagram illustrating a set of operations for performing restore processing in accordance with an embodiment of the present disclosure. The processing described with reference to FIG. 8 may be performed by a data storage system node (e.g., data storage system 102a or 102n, virtual storage system 310, or data storage system node 410a) to restore data (e.g., during a restore operation, such as restore process 412) to a local volume (e.g., volume 235 or volume 230a) previously backed up by the same data storage system or another data storage system to an object store (e.g., object store 425) of a cloud (e.g., hyperscaler 320 or 420). In this example, it is assumed the file system of the data storage system node utilizes multiple phases to persist data to disk and represents a write anywhere file system. It is further assumed, a restore operation has been initiated to restore backup data, for example, representing a full volume, a directory, a set of files, or a single file, from an object store (e.g., object store 425) of a cloud (e.g., hyperscaler 420) directly or indirectly via another data storage system (e.g., data storage system node 410b).

At block 810, a lookup is performed in a CBMAP metafile (e.g., CBMAP 640) that maintains a mapping of CBNs to corresponding VBNs for a CBN associated with a buffer in a process buffer list (e.g., process buffer list 611), representing a list of user buffers that have been loaded into memory and that are to be processed through the CBMAP to perform deduplication for the current restore operation. In one embodiment in which CBMAP entries are not directly inserted into the CBMAP but rather are staged, a hash module (e.g., hash 620) may be used in front of the CBMAP that can be used to check whether a pending entry has already been inserted to the CBMAP or staged for insertion within the CBMAP.

At decision block 820, a determination is made regarding the lookup result. As noted above, in one embodiment, there are three potential outcomes of the lookup (i.e., (i) the CBN is not found, meaning the CBN has not been previously retrieved from the cloud during the current restore operation; (ii) the CBN is found within a pending entry of the CBMAP (or staged for insertion into the CBMAP), meaning the corresponding VBN on the local volume has not yet been allocated and updated within the entry; and (iii) the CBN is found within a valid entry of the CBMAP, meaning the VBN on the local volume has been allocated and has been updated within the entry). When the CBN is not found within the CBMAP, processing continues with block 830. When the CBN is associated with a pending entry, processing continues with block 870. When the CBN is associated with a valid entry within the CBMAP, processing continues with block 890.

At block 830, a read is issued to the cloud for the CBN, for example, by or responsive to a request from a restore scanner (e.g., restore scanner 610). The block returned from the cloud may be saved as a buffer in memory (e.g., in-memory buffers 612).

At block 840, pre-insertion processing may be performed to allocate memory for a memory-resident data structure (e.g., representing a pending entry) into which the CBN will be inserted.

At block 850, during the modify phase of the file system, the CBN may be inserted into the memory-resident data structure with the pending flag set, and the buffer associated with the CBN may be dirtied.

At block 860, during a CP, a new VBN pair is allocated and the corresponding CBMAP entry is updated to include the new VBN pair.

At block 870, the file ID and the file block number are recorded in a pending buffer list (e.g., pending buffer list 651) for subsequent processing during the next CP.

At block 880, after completion of the next CP, the pending buffer list is moved to the process buffer list to be batched processed by the restore scanner during its next run.

At block 890, the VBN pair is read from the valid entry of the CBMAP and the VVBN is shared with the file (e.g., file 731b) currently being restored to allow a file indirect block of the file to reference (e.g., via reference 741) the existing file data block (e.g., shared data block 751) rather than storing a duplicate of the existing file data block.

While in the context of the present example, only a single CBN lookup is described, it is to be appreciated the restore process may involve iterating through each file being recovered and each block of each file.

It should be noted that while various examples described herein are with reference to a write anywhere file system, the teachings of the subject matter may be utilized with any suitable file system, including a write in place file system.

While in the context of the examples described with reference to the flow diagrams of FIGS. 5 and 8, a number of enumerated blocks are included, it is to be understood that examples may include additional blocks before, after, and/or in between the enumerated blocks. Similarly, in some examples, one or more of the enumerated blocks may be omitted and/or performed in a different order.

Compression Groups

In order to simplify the discussion above various examples have been described without taking into consideration compression groups (CGs). If the file system performs inline file compression along with the performance of storage efficiency preservation, the CBMAP entries may have two forms (e.g., an individual entry and a composite entry). Individual entries or non-composite entries may be associated with a single file block number of a CG that could not be compressed. Composite entries may be associated with a set of file block numbers that are compressed to form a CG.

Assuming, pending entries are inserted into the CBMAP (e.g., CBMAP 640) prior to compression and that some blocks might not be successfully compressed, in one embodiment, the restore scanner (e.g., restore scanner 610) should insert both composite and non-composite entries into the CBMAP and then remove one or more of the pending entries as appropriate based on the result of the compression. For example, if a CG includes $CBN_1$ and $CBN_2$, then when performing pending entry insertion the restore scanner 640 should insert a composite entry with ($CBN_1$, $CBN_2$) as well as two non-composite entries (i.e., one for $CBN_1$ and another for $CBN_2$). If $CBN_1$ and $CBN_2$ are subsequently successfully compressed, then non-composite entries for $CBN_1$ and $CBN_2$ may be removed from the CBMAP; otherwise, if the compression fails or is dropped then the composite entry may be removed from the CBMAP.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks. Volatile media includes dynamic memory, such as a main memory of a computer system. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Figure 9:
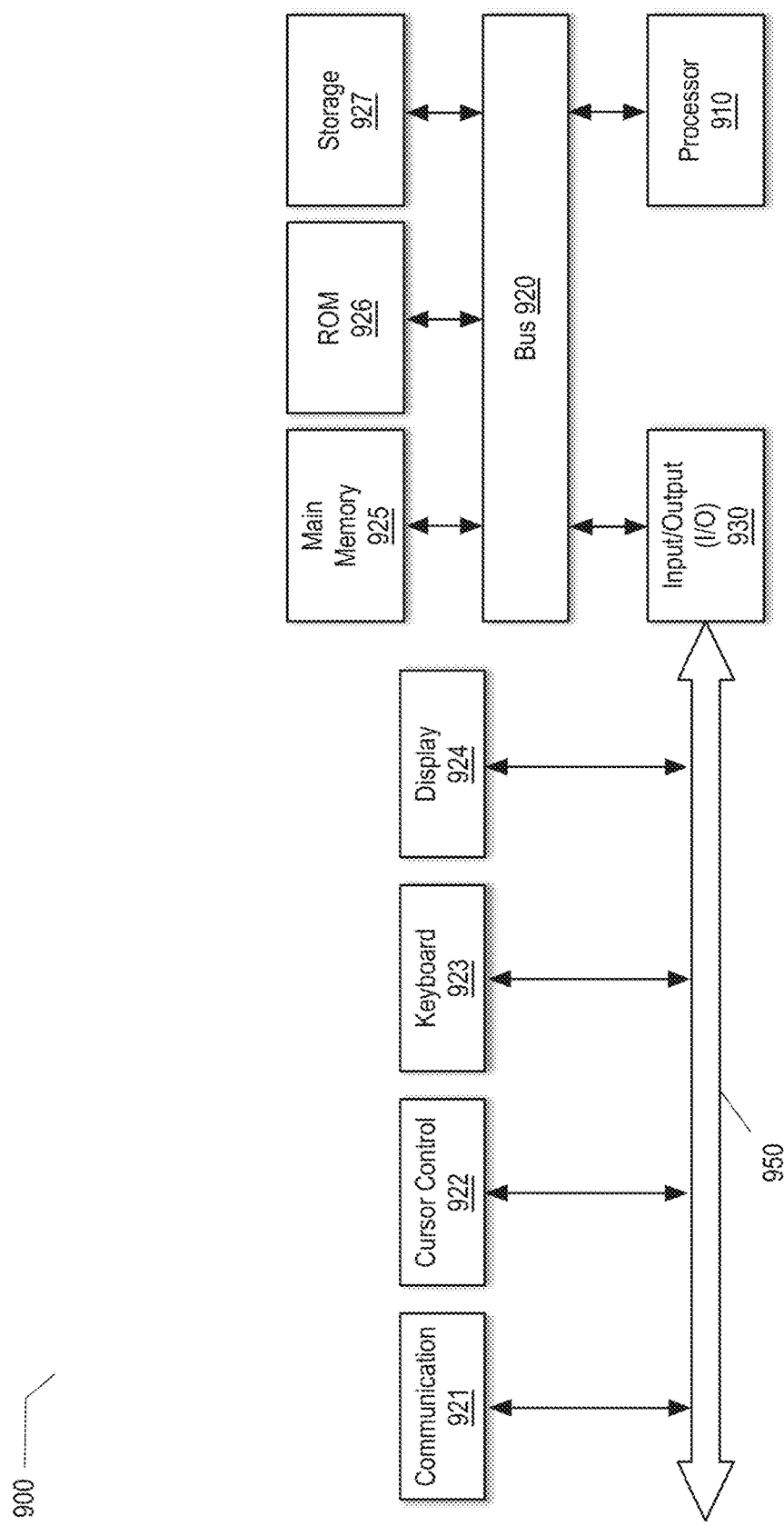
FIG. 9 is a block diagram illustrating an example of a computer system in which or with which embodiments of the present disclosure may be utilized.

FIG. 9 is a block diagram illustrating an example of a computer system 900 in which or with which embodiments of the present disclosure may be utilized. In the context of the present example, computer system 900 (which may represent a host system of a cloud (e.g., hyperscaler 320) that runs a VM or container, which hosts a virtual storage system (e.g., virtual storage system 310)) includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of restoring data from an object store of a cloud to a volume of a data storage system, the method comprising:

maintaining, by the data storage system, a cloud block map (CBMAP) having entries that each map a cloud block number (CBN) of a plurality of CBNs to a corresponding block number of the volume, wherein a portion of the data associated with a given CBN of the plurality of CBNs was previously retrieved from the object store and stored within a given file data block of the volume, and wherein the given file data block is identified by the corresponding block number; and preserving storage efficiency by the data storage system by:

prior to issuing a request for a particular portion of the data associated with a particular CBN from the object store, determining the particular CBN is present within an entry of the CBMAP that is valid; and responsive to the determination, avoiding storing a duplicate file data block on the volume containing the particular portion of the data by instead storing a reference to the given file data block identified by the block number corresponding to the particular CBN.

2. The method of claim 1, wherein the reference comprises a volume block number (VBN) or a VBN pair including a virtual volume block number (VVBN) and a physical volume block number (PVBN) of the given file data block and wherein the reference is stored within an inode file data block or a file indirect block of a file currently being restored.

3. The method of claim 1, wherein said maintaining further comprises staging insertion of a pending entry for a first CBN within the CBMAP by:

temporarily storing the first CBN within a memory-resident data structure by a file system of the data storage system; and committing the pending entry to the CBMAP during an insert stage performed by the file system.

4. The method of claim 3, wherein said maintaining further comprises, during a consistency point:

allocating the corresponding block number for the first CBN;

after the corresponding block number for the first CBN has been allocated, staging an update to the pending entry to include the corresponding block number; and during the update, marking the pending entry as valid.

5. The method of claim 4, wherein the file system comprises a multi-phase file system or a write anywhere file system.

6. The method of claim 5, wherein said temporarily storing is performed during a modify phase of the file system.

7. The method of claim 1, wherein the corresponding block number comprises a block number pair including a virtual volume block number (VVBN) and a physical volume block number (PVBN).

8. A data storage system comprising:
one or more processing resources; and
instructions that when executed by the one or more processing resources cause the data storage system to restore data from an object store of a cloud to a volume of the data storage system, including:

maintaining a cloud block map (CBMAP) having entries that each map a cloud block number (CBN) of a plurality of CBNs to a corresponding block number of the volume, wherein a portion of the data associated with a given CBN of the plurality of CBNs was previously retrieved from the object store and stored within a given file data block of the volume, and wherein the given file data block is identified by the corresponding block number; and preserving storage efficiency by the data storage system by:

prior to issuing a request for a particular portion of the data associated with a particular CBN from the object store, determining the particular CBN is present within an entry of the CBMAP that is valid; and responsive to the determination, avoiding storing a duplicate file data block on the volume containing the particular portion of the data by instead storing a reference to the given file data block identified by the block number corresponding to the particular CBN.

9. The data storage system of claim 8, wherein the reference comprises a volume block number (VBN) or a VBN pair including a virtual volume block number (VVBN) and a physical volume block number (PVBN) of the given file data block and wherein the reference is stored within an inode file data block or a file indirect block of a file currently being restored.

10. The data storage system of claim 8, wherein said maintaining further comprises staging insertion of a pending entry for a first CBN within the CBMAP by:

temporarily storing the first CBN within a memory-resident data structure by a file system of the data storage system; and committing the pending entry to the CBMAP during an insert stage performed by the file system.

11. The data storage system of claim 10, wherein said maintaining further comprises, during a consistency point:

allocating the corresponding block number for the first CBN;

after the corresponding block number for the first CBN has been allocated, staging an update to the pending entry to include the corresponding block number; and during the update, marking the pending entry as valid.

12. The data storage system of claim 11, wherein the file system comprises a multi-phase file system or a write anywhere file system.

13. The data storage system of claim 12, wherein said temporarily storing is performed during a modify phase of the file system.

14. The data storage system of claim 8, wherein the corresponding block number comprises a block number pair including a virtual volume block number (VVBN) and a physical volume block number (PVBN).

15. A non-transitory machine readable medium storing instructions, which when executed by one or more processing resources of a data storage system including a first distributed storage system and a second distributed storage system, cause the data storage system restore data from an object store of a cloud to a volume of the data storage system, including:

maintaining a cloud block map (CBMAP) having entries that each map a cloud block number (CBN) of a plurality of CBNs to a corresponding block number of the volume, wherein a portion of the data associated with a given CBN of the plurality of CBNs was previously retrieved from the object store and stored within a given file data block of the volume, and wherein the given file data block is identified by the corresponding block number; and preserving storage efficiency by the data storage system by:

prior to issuing a request for a particular portion of the data associated with a particular CBN from the object store, determining the particular CBN is present within an entry of the CBMAP that is valid; and responsive to the determination, avoiding storing a duplicate file data block on the volume containing the particular portion of the data by instead storing a reference to the given file data block identified by the block number corresponding to the particular CBN.

16. The non-transitory machine readable medium of claim 15, wherein the reference comprises a volume block number (VBN) or a VBN pair including a virtual volume block number (VVBN) and a physical volume block number (PVBN) of the given file data block and wherein the reference is stored within an inode file data block or a file indirect block of a file currently being restored.

17. The non-transitory machine readable medium of claim 15, wherein said maintaining further comprises staging insertion of a pending entry for a first CBN within the CBMAP by:

temporarily storing the first CBN within a memory-resident data structure by a file system of the data storage system; and committing the pending entry to the CBMAP during an insert stage performed by the file system.

18. The non-transitory machine readable medium of claim 17, wherein said maintaining further comprises, during a consistency point:

allocating the corresponding block number for the first CBN;

after the corresponding block number for the first CBN has been allocated, staging an update to the pending entry to include the corresponding block number; and during the update, marking the pending entry as valid.

19. The non-transitory machine readable medium of claim 18, wherein the file system comprises a multi-phase file system or a write anywhere file system.

20. The non-transitory machine readable medium of claim 17, wherein said temporarily storing is performed during a modify phase of the file system.

* * * * *